US006741551B1

(12) United States Patent
Cherubini

(10) Patent No.: US 6,741,551 B1
(45) Date of Patent: May 25, 2004

(54) HYBRID TDMA/CDMA SYSTEM BASED ON FILTERED MULTITONE MODULATION

(75) Inventor: Giovanni Cherubini, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/478,565

(22) Filed: Jan. 6, 2000

Related U.S. Application Data
(60) Provisional application No. 60/115,369, filed on Jan. 11, 1999.

(51) Int. Cl.$^7$ ............................................. H04J 11/00
(52) U.S. Cl. ................ 370/210; 370/485; 370/486; 370/342; 708/404; 708/403; 375/260; 375/261
(58) Field of Search ........................... 370/206, 207, 370/208, 209, 210, 211, 480, 485, 486, 337–347, 342; 375/260, 346, 222, 223, 286, 261, 347, 348, 349; 455/3.02, 3.04, 3.05, 3.06; 725/111, 121–126; 708/404, 403

(56) References Cited

U.S. PATENT DOCUMENTS

| 5,345,439 A | * | 9/1994 | Marston | 370/320 |
| 5,953,344 A | * | 9/1999 | Dail et al. | 370/443 |
| 6,061,407 A | * | 5/2000 | Cherubini et al. | 375/265 |
| 6,370,153 B1 | * | 4/2002 | Eng | 370/438 |
| 6,469,991 B1 | * | 10/2002 | Chuah | 370/329 |
| 6,567,416 B1 | * | 5/2003 | Chuah | 370/418 |

OTHER PUBLICATIONS

Filtered Multitone Modulation, Geneva, Jun. 21—Jul. 2, 1999.*

* cited by examiner

Primary Examiner—Wellington Chin
Assistant Examiner—Chuong Ho
(74) Attorney, Agent, or Firm—Thomas A. Beck; Louis P. Herzberg

(57) ABSTRACT

A multiple access communications network system in which a head-end controller (HC) broadcasts data and medium-access control (MAC) information over a set of downstream channels to several stations, and these stations send information to the HC over a shared upstream channel.

48 Claims, 11 Drawing Sheets

HYBRID TDMA/CDMA SYSTEM BASED ON FILTERED MULTITONE MODULATION

PRIORITY

This application claim priority from Provisional Application bearing Ser. No. 60/115,369 filed Jan. 11, 1999.

CROSS REFERENCES

The present invention is also related to the following applications even dated herewith: Ser. No. 60/116,137, entitled "Communication Network" to G. Cherubini et al.; Ser. No. 60/115,370, entitled "Filtered Multitone Transmission with Applications to DSL Technologies" to G. Cherubini et al., which are incorporated by reference herein.

BACKGROUND OF THE INVENTION

Examples of emerging two-way HFC systems are addressed in the following references: IEEE Project 802 14/a Draft 3 Revision 1, "Cable-TV Access Method and Physical Layer Specification," IEEE, Apr. 13, 1998; MCNS Interim Specification, "Data Over Cable Interface Specifications—Radio Frequency Interface Specification," MCNS Holdings, L. P., Mar. 26, 1997; C. A Eldering, N. Himayat, and F. M. Gardner, "CATV Return Path Characterization for Reliable Communications," IEEE Commun. Mag., vol. 33, pp. 62–69, August 1995; C. Bisdikian, K. Maruyama, D. I. Seidman, and D. N. Serpanos, "Cable Access Beyond the Hype: On Residential Broadband Data Services over HFC Networks," IEEE Commun. Mag., vol. 34, pp. 128–135, November 1996.

Sections 4 and 6 of the "MCNS Interim Specification, 'Data Over Cable Interface Specifications—Radio Frequency Interface Specification,'" reference are incorporated by reference. The multichannel multipoint distribution service (MMDS) and the local multipoint distribution service (LMDS) are exemplified in a reference by W. Honcharenko, J. P. Kruys, D. Y. Lee, N. J. Shah, "Broadband wireless access," IEEE Commun. Mag., vol. 35, pp. 20–27, January 1997.

The design of a HC modem transmitter and station modem receivers for downstream transmission presents some technical challenges due to transmission rates in the order of 30 to 45 Mbit/s per downstream channel. However, owing to the continuous broadcast mode of downstream transmission over a channel with low distortion and high signal-to-noise ratio (typically 42 dB by regulation) well known signal-processing techniques can be applied. In the upstream direction, implementation of physical (PHY) layer transmission and MAC layer functions pose considerable technical challenges. First, because signals may be transmitted in bursts, HC receivers with fast synchronization capabilities are essential. Second, individual station signals must be received at the HC at defined arrival times and power levels. Therefore, determination of the round-trip delay between the HC and each individual station and individual transmit power control for each station to compensate for widely varying attenuations in the upstream direction are important functions. Third, the upstream channel is generally much more noisy and subject to more distortion than the downstream channel.

Transmission schemes based on single-carrier quadrature-amplitude modulation (QAM) can represent a robust solution for upstream transmission. These schemes, however, are generally less efficient and robust in the presence of impulse noise and narrow-band interference than multicarrier modulation techniques, also known as orthogonal frequency division multiplexing (OFDM), addressed in J. A. C. Bingham, "Multicarrier Modulation for Data Transmission: An Idea Whose Time Has Come," IEEE Commun. Mag., vol. 28, pp. 5–14, May 1990.

The Bingham, et al. reference is incorporated by reference in its entirety. In general, OFDM systems employ M orthogonal subcarriers for parallel transmission of blocks of M symbols over M subchannels. For example, versions of orthogonal frequency division multiplexing (OFDM) known as discrete multitone (DMT) modulation and discrete wavelet multitone (DWMT) modulation are considered as transmission schemes for the digital subscriber line. For details see references by J. S. Chow, J. C. Tu, and J. M. Cioffi, "A Discrete Multitone Transceiver System for HDSL Applications," IEEE J. Select. Areas Commun., vol. 9, pp. 895–908, August 1991; "Network and Customer Installation Interfaces—Asymmetric Digital Subscriber Line (ADSL) Metallic Interface," ANSI TIE1.413–1995, August 1995; and S. D. Sandberg and M. A. Tzannes, "Overlapped Discrete Multitone Modulation for High Speed Copper Wire Communications," IEEE J. Select. Areas Commun., vol. 13, pp. 1571–1585, December 1995.G., all of which are incorporated by reference in their entireties.

Multitone modulation with a high level of subchannel spectral containment was mentioned in both European Patent application bearing the title "Communications Network System", G. Cherubini and G. Ungerboeck, filed on the same day as the present application and currently assigned to the assignee of the present application, and J. Karaoguz, J. Yu, V. Eyuboglu, "Comparison of Single-Carrier, Multi-Carrier, and Spread Spectrum Modulation for Upstream PHY Layer in HFC CATV Networks," IEEE 802.14 contribution 98–018, July 1998. These references are incorporated by reference herein in their entireties.

In the Karaoguz et al. reference, the filters are ideal unrealizable square-root raised cosine filters with zero roll-off. As mentioned above, a multiple access scheme for upstream transmission in HFC networks would have to be suitable for transmission of short messages in burst mode, and also would have to ensure reliable communications in the presence of impulse noise and narrowband interference. To accomodate these requirements, we propose a hybrid time-division multiple access (TDMA)/synchronous code-division multiple access (S-CDMA) scheme based on FMT modulation.

SUMMARY OF THE INVENTION

The present invention relates to multiple-access communications network systems in which a head-end controller (HC) broadcasts data and medium-access control (MAC) information over a set of downstream channels to several stations, and these stations send information to the HC over a shared upstream channel. Illustrative examples of systems exhibiting these characteristics arc two-way hybrid fiber/cable (HFC) systems and their wireless counterparts, i.e., multichannel multipoint distribution service (MMDS) and local multipoint distribution service (LMDS).

In accordance with the present invention, there is an upstream transmission in HFC networks, a new transmission technique related to OFDM, named filtered multitone (FMT) modulation. This is advantageous because FMT modulation exhibits significantly lower spectral overlapping between adjacent subchannels and provides higher transmission efficiency than DMT, and is better suited for passband transmission than DWMT.

A digital transmission scheme is disclosed for use in a multiple access communications network system with a system comprising an upstream channel with a bandwidth of $1/T_c$ Hz for transmission of information from remote stations to a head-end node, where a baseband signal is transmitted as passband signal employing a modulator, said baseband signal being generated by employing M subcarriers for transmission over M subchannels of blocks of M symbols, each taken from a symbol constellation, where the transmission over the i-th subchannel, with i=0, ..., M−1, takes place at a modulation rate of $1/(m_i T_c)$ symbols/s, the i-th subchannel has a bandwidth of $1/(m_i T_c)$ Hz, where the numbers $m_i$ satisfy the condition:

$$\sum_{i=0}^{M-1} \frac{1}{m_i} = 1$$

and, at least one subchannel has spectral nulls at the bandedges, and at least one subchannel has zero guard bands.

DESCRIPTION OF THE DRAWINGS

The invention is described in detail below with references to the following schematic drawings. It is to be noted that the Figures are not drawn to scale.

DESCRIPTION OF PREFERRED EMBODIMENTS

The basic concept and implementations of the present invention are described as follows. First, a brief overview of HFC networks is given in Section 1. Then, secondly, (in Section 2) the principles of FMT modulation are explained. The hybrid TDMA/S-CDMA scheme, according to the present invention, based on FMT modulation for upstream transmission in HFC networks is described in the third section (Section 3). Sample algorithms for initial registration of stations joining the network, and for contention resolution among stations seeking access to the upstream channel, are discussed in the fourth and fifth sections, respectively (Sections 4 and 5).

Figure 1:
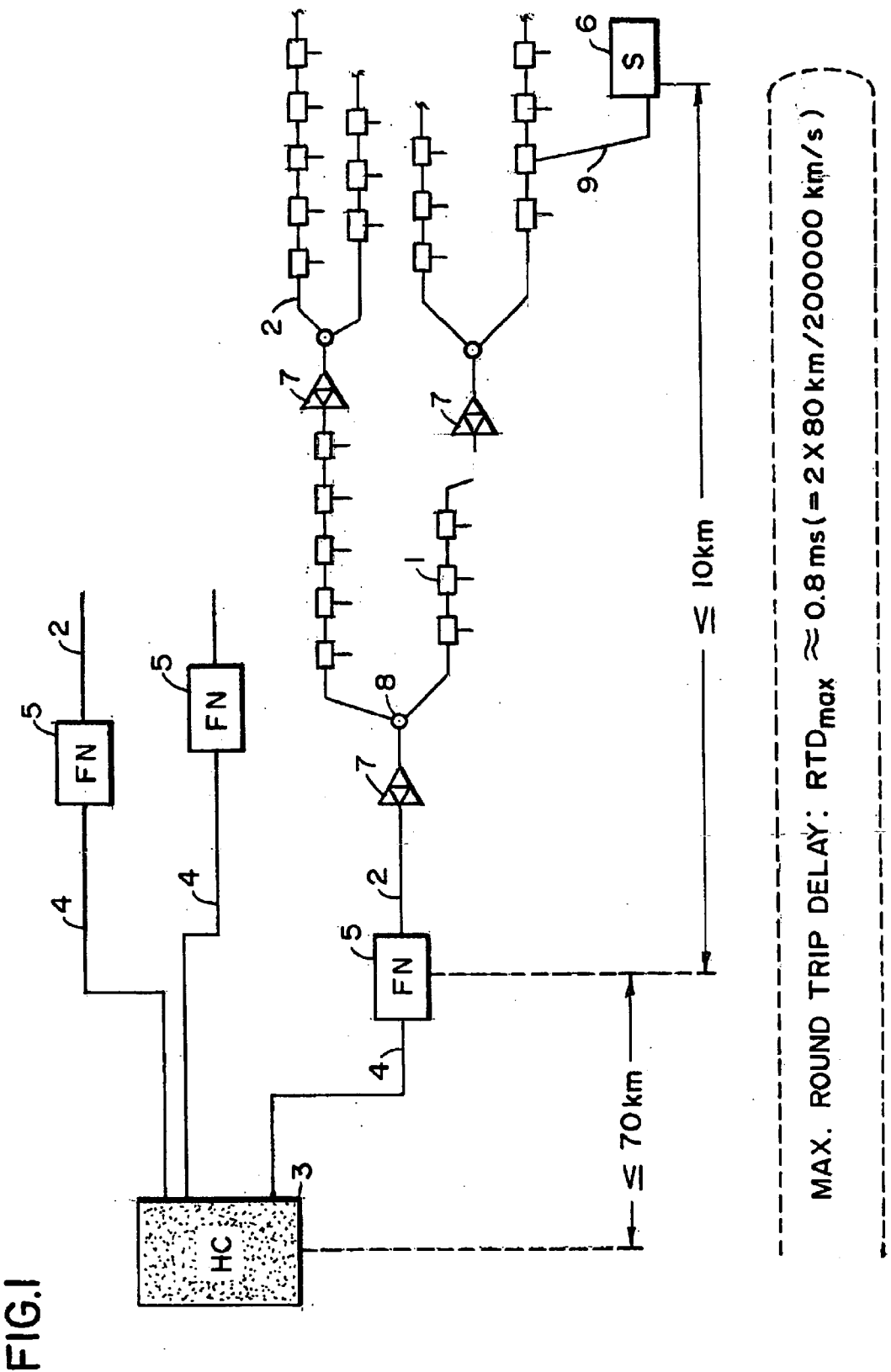
FIG. 1 Shows the topology of a typical HFC network.

1. HFC networks: A hybrid fiber/coax (HFC) system is a point-to-multipoint, tree and branch access network in the downstream direction, with downstream frequencies in the 50–860 MHz bandwidth and a multipoint-to-point, bus access network in the upstream direction, with upstream frequencies in the 5–42 MHz bandwidth. The IEEE 802.14 working group is currently chartered with creating physical (PHY) layer and MAC layer specifications for HFC systems, and has produced a draft standard addressed in IEEE Project 802.14/a Draft 3 Revision 1, "Cable-TV Access Method and Physical Layer Specification," IEEE, Apr. 13, 1998 supra. The Multimedia Cable Network System (MCNS), an industry consortium, has also contributed a document with PHY and MAC layer specifications (for details see the reference "MCNS Interim Specification, 'Data Over Cable Interface Specifications—Radio Frequency Interface Specification,' MCNS Holdings, L. P., Mar. 26, 1997," supra, sections 4 and 6 of which are incorporated by reference.). The topology of a typical HFC network is illustrated in FIG. 1. The maximum round-trip delay between the HC 3 and a station 6 is of the order of 1 ms. Stations 6 are connected to the HC 3 over coaxial cables 4, 9, taps 1, bi-directional split-band amplifiers 7, splitters 8, fiber nodes (FN) 5, and fiber cables 4.

In the downstream direction, continuous broadcast operation is specified. The ITU J.83 recommendation defines two transmission schemes referred to as Annex A and B by which data rates in the range of 30–45 Mbit/s are achieved in 6 or 8 MHz channel bandwidths. With the specified modulation schemes, spectral efficiencies of 5–8 bits/s/Hz are obtained, as described in ITU-T Recommendation J.83, "Digital Multi-Programme Systems for Television Sound and Data Services for Cable Distribution," ITU-T Study Group 9, Oct. 24, 1995.

In the upstream direction, impulse noise and narrowband interference are the limiting factors. These interferences stem mainly from home appliances and HF-radio and accumulate on the return path to the head end. These disturbances are usually referred to as "ingress noise" and exhibit time-varying characteristics. Because of the high level of these impairments, spectral efficiencies for upstream transmission are limited to about 2–4 bits/s/Hz.

The spectrum of the noise suggests that upstream transmission must have an inherent capability of frequency agile operation with various modulation rates and spectral efficiencies. In the MCNS Interim Specification, "Data Over Cable Interface Specifications—Radio Frequency Interface Specification," MCNS Holdings, L. P., Mar. 26, 1997, reference, single-carrier QAM with 4 or 16-point signal constellations is defined. Carrier frequency, modulation rate, and spectral efficiency are selected by the HC and are sent as MAC information to the stations. Modulation rates up to 2.560 MBaud are defined. The receivers of upstream modems must have burst-synchronization as well as equalization capability.

Again, in the MCNS Interim Specification, "Data Over Cable Interface Specifications—Radio Frequency Interface Specification," MCNS Holdings, L. P., Mar. 26, 1997, a TDMA scheme is considered where upstream transmission is divided into a stream of mini-slots. Each mini-slot is numbered relative to a master reference clock maintained by the HC. The HC distributes timing information to the stations 6 (e.g. cable modems) by means of Time Synchronization (SYNC) messages, which include time stamps.

Figure 2:
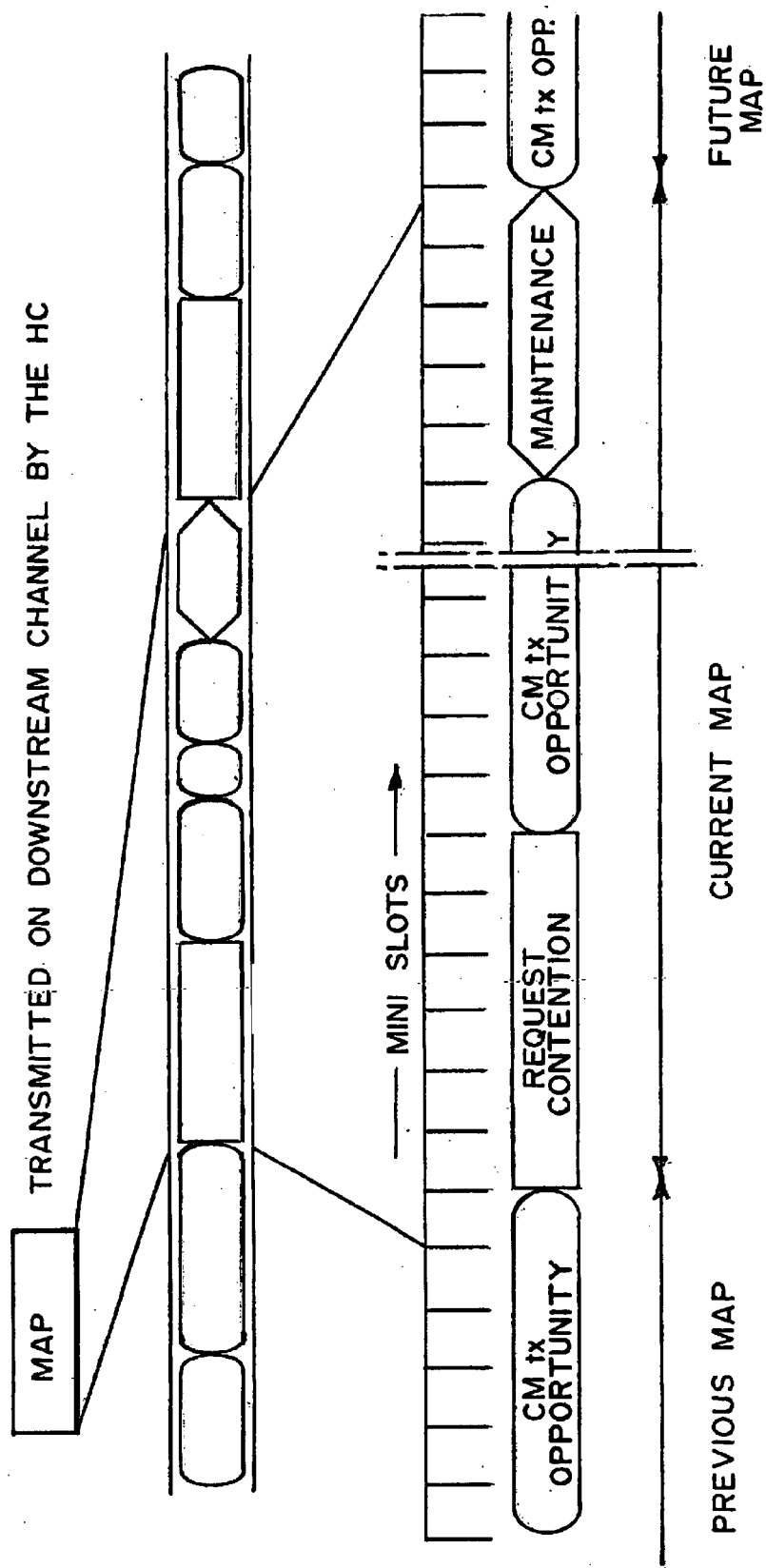
FIG. 2 Illustrates an example of a known Allocation Map (MAP) message.

From these time stamps, the stations 6 establish a local time base slaved to the time base of the HC. For upstream transmission, access to the mini-slots is controlled by Allocation Map (MAP) messages, which describe transmission opportunities on upstream channels. A MAP message includes a variable number of information elements (IE), each defining the modality of access to a range of mini-slots in an upstream channel, as illustrated in FIG. 2.

At the beginning of the registration process, a station 6 tunes its receiver to a downstream channel over which it receives SYNC messages from the HC. The acquired local time base is retarded by the propagation delay from the HC to the station 6. The cable modem of station 6 then monitors the downstream channel until it receives a MAP message with an Initial Maintenance IE, which specifies a time interval during which new stations 6 may send a Ranging Request (RNG-REQ) message to join the network. At the time specified in the MAP message, the station 6 sends a first RNG-REQ message with lowest transmit power level.

If the cable modem does not receive a response within a time-out period, either the RNG-REQ messages from other cable modems have collided, or the employed transmit power level was too low. To reduce the probability of repeated collisions, for contention resolution a random backoff protocol is employed. After a backoff time interval has elapsed, the station 6 looks for a new MAP message with an Initial Maintenance IE, and at the specified time retransmit a RNG-REQ message with increased transmit power level. These steps are repeated until the HC eventually detects a RNG-REQ message, from which the HC can determine the round-trip delay and the power correction value to be used by the station's cable modem for future upstream transmission. In particular, the round-trip delay compensation is determined such that, when the round-trip delay compensation is applied in the station 6, future upstream transmissions of this station 6 arrive at defined time instants (epochs) at the HC. The HC then sends the round-trip delay compensation and the transmit power adjustment value for future transmission to the station 6 in a Ranging Response (RNG-RSP) message.

As mentioned above, the HC controls access of registered stations 6 to the upstream channel through MAP messages. In particular, MAP messages include Request IEs to provide mini-slots in which stations may send requests for upstream data transmission. The HC then determines whether requests for resource allocation from multiple stations have collided. A random backoff protocol is also employed for contention resolution to reduce the probability of repeated collisions of request messages.

2. FMT modulation: OFDM systems are now considered that are represented by the block diagram shown in FIG. 3. OFDM signals are thus regarded as baseband signals in the fundamental frequency band $$\left[-\frac{M}{2T}, \frac{W}{2T}\right],$$

where M denotes the number of subchannels and T denotes the modulation interval. In HFC networks, the baseband signal is transated to a carrier frequency $f_c$ before transmission. The sequence of blocks of complex input symbols at the modulation rate 1/T is represented by $\{A_n\}$, where the vector $A_n=\{A_n^{(i)}, i=0, \ldots, M-1\}$ denotes the block of symbols transmitted in the n-th modulation interval. Conceptually, the factor-M upsamplers in FIG. 3 insert M-1 zeros between the symbols in each of the M symbol sequences. These interpolated sequences at the rate M/T are convolved with the impulse responses $h_k(i)$, i=0, ..., M-1, of M filters with frequency responses given by $H_i(f)=\Sigma e^{-j2\pi fkT/M}h_k(i)$, i=0, ..., M-1. The signal $y_k$ is given by the addition of the filter output signals, and is expressed by $$y_k = \sum_{n=-\infty}^{\infty}\sum_{m=0}^{M-1} A_n^{(m)} h_{k-nM}(m). \tag{1}$$

The received signal is filtered by a bank of M filters with impulse responses $g_k(i)$, i=0, ..., M-1, whose frequency responses are $G_i(f)$, i=0, ..., M-1. The filter output signals are sampled at the modulation rate 1/T, and the samples are used to determine a reliable estimate of the sequence of knitted symbols. To ensure that transmission free of intersymbol interference (ISI) within a subchannel as well as free of interchannel interference (ICI) between subchannels is achieved, a generalized Nyquist criterion must hold. Assume the channel is ideal with frequency response $H_{ch}(f)=1$, and the transmit and receive filters satisfy the symmetry conditions $g_k(i)=h_{-k}^*(i)$, i=0, ..., M-1, where the asterisk denotes complex conjugation. Then in the time domain the criterion for perfect signal reconstruction is given by $$\sum_k h_k(i) h_{k-nM}^*(j) = \delta_{i-j}\delta_n, \quad 0 \le i, j \le M-1, \tag{2}$$

where $\delta_i$ is defined as the Kronecker delta.

Figure 3:
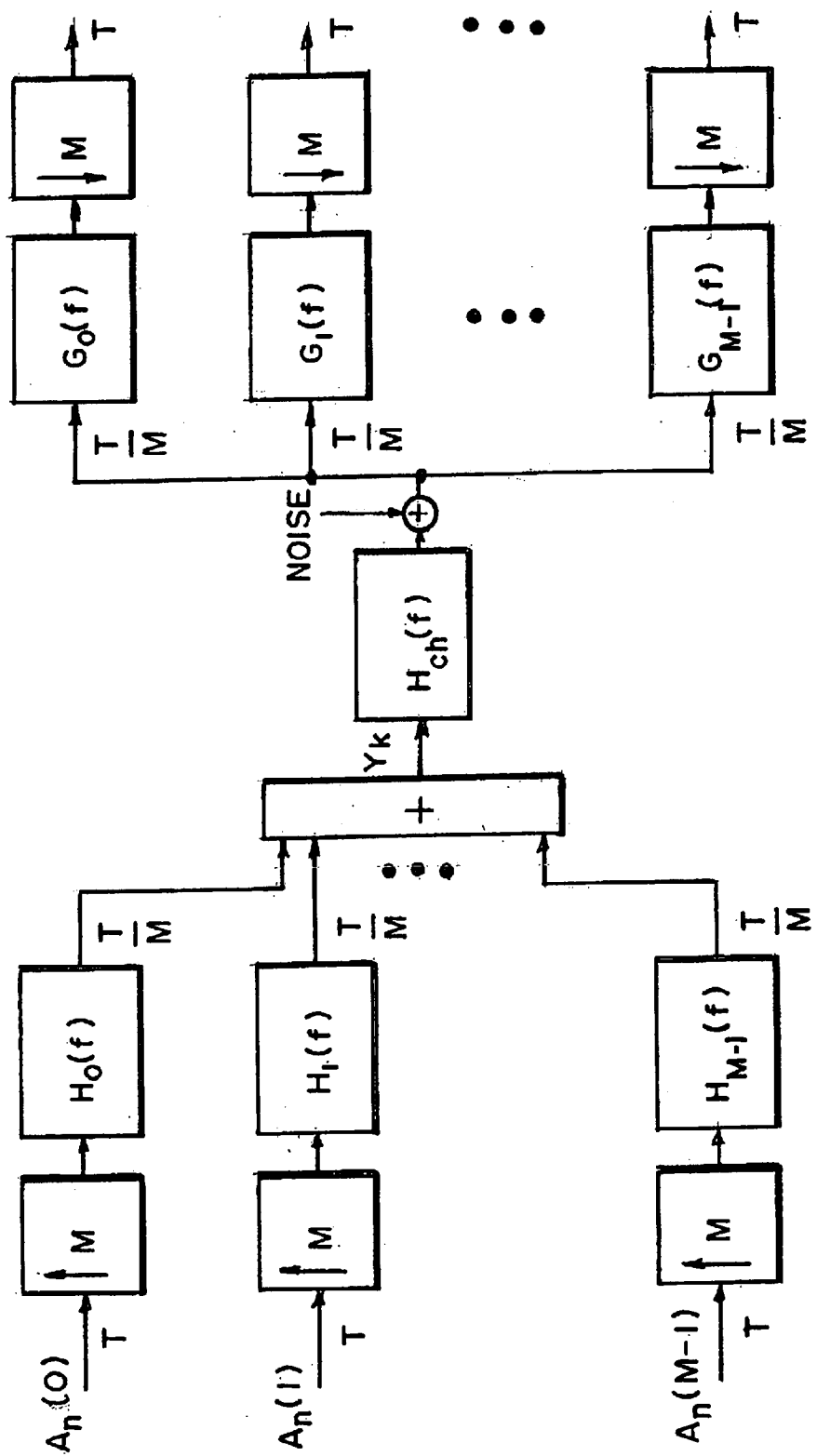
FIG. 3 Shows a representation of a transmission system related to OFDM according to the present invention.
Figure 4:
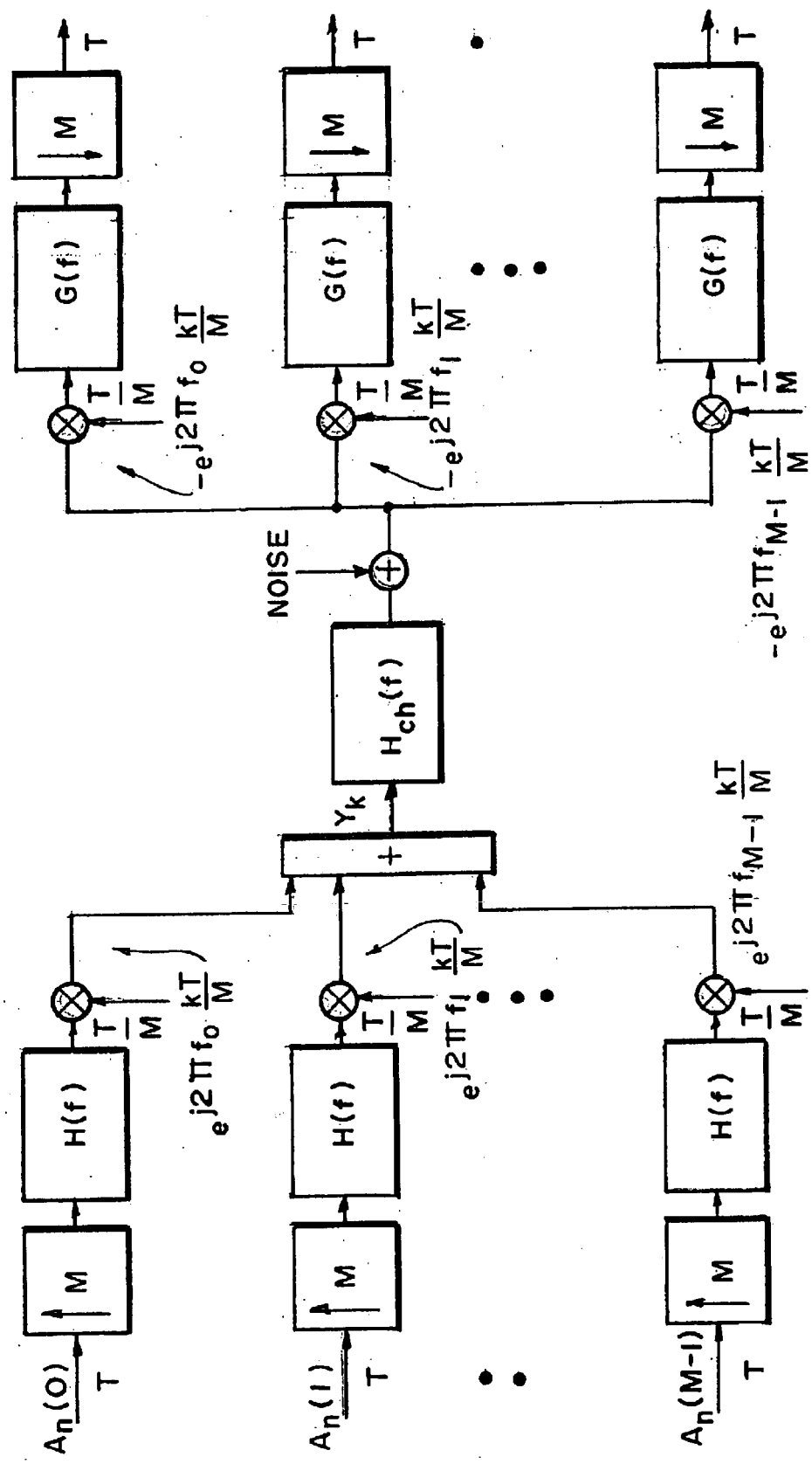
FIG. 4 Is a block diagram of a transmission system related to OFDM employing uniform filter banks according to the present invention.
Figure 5:
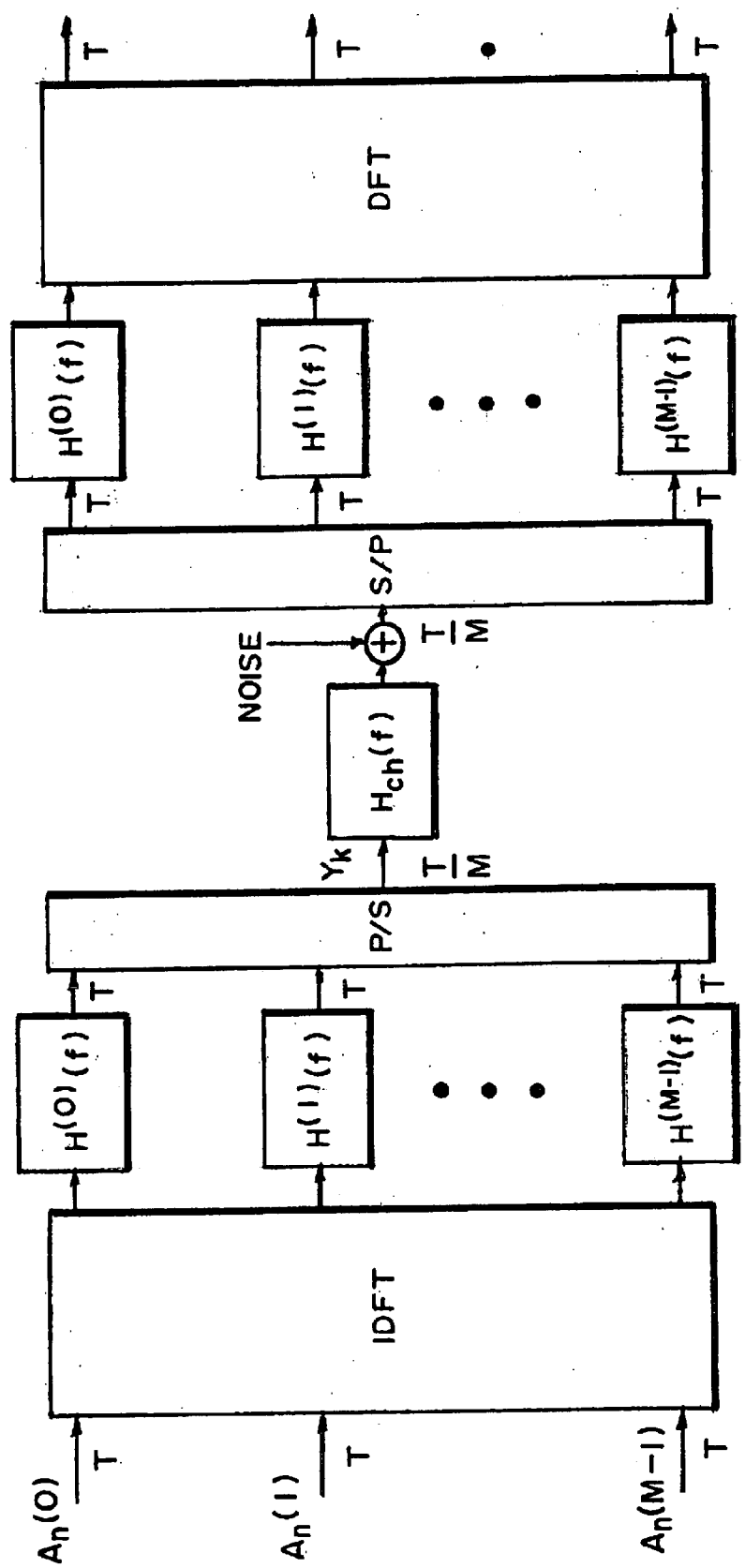
FIG. 5 Shows an efficient implementation of a transmission system related to OFDM (preferred embodiment of the present invention).

For large M, a direct implementation of an OFDM system as shown in FIG. 3 would require an exceedingly large computational complexity, since all the filtering operations are performed at the high rate M/T. The complexity of an OFDM system, however, is substantially reduced by resorting to the polyphase implementation of a uniform filter bank, where filtering operations are performed by frequency-shifted versions of a baseband prototype filter. We refer to the scheme depicted in FIG. 4, where H(f) and G(f) denote the frequency responses of the prototype filters for the transit and receive filter banks, respectively. Assume the M carrier frequencies are given by $f_i=i/T$, i=0, ..., M-1. We consider a causal FIR transmit prototype filter with length $\gamma M$, i.e., $h_k$ may assume nonzero values only if k=0, ..., $\gamma M-1$, and a receive prototype filter given by $g_k=h_{\gamma M-k}^*$. The scheme of FIG. 4 can be regarded as a special case of the OFDM system shown in FIG. 3. We recall that the filtering elements with impulse responses $h_i^{(i)}=h_{\gamma M+i}$, i=0, ..., M-1, are known as the polyphase components of the prototype filter, with frequency responses denoted by $H^{(i)}(f)$, i=0, ..., M-1. It can be shown that the transmit filter bank of the system in FIG. 4 can be implemented by an inverse discrete Fourier transform (IDFT) followed by an M-branch polyphase network and a parallel-to-serial (P/S) converter as addressed in [13]. In a similar manner we find that the receive filter bank can be implemented by a serial-to-parallel (S/P) converter, an M-branch polyphase network, and a discrete Fourier transform (DFT). The frequency responses of the polyphase filters are given by $G^{(i)}(f)=H^{(M-1-i)*}(f)$, i=0, ..., M-1. All filtering operations are performed at the low rate 1/T. Note that the computationally more efficient inverse fast Fourier transform and fast Fourier transform are used in practice instead of IDFT and DFT, further reducing system complexity. An efficient implementation of an OFDM system is illustrated in FIG. 5.

As mentioned earlier, DWMT and DMT represent variants of OFDM that can be considered for practical applications. DWMT modulation may be viewed as a particular case of the scheme of FIG. 5 with real input symbol vectors and special grouping of subchannel filters. The prototype filter is usually designed such that perfect reconstruction of the transmitted input symbol vector is possible at the DWMT demodulator output under the assumption of an ideal channel without noise and distortion. Perfect reconstruction requires that some spectral overlap of adjacent subchannels is allowed. In practice, equalization must be employed to cope with a nonideal channel characteristic. See: S. D. Sandberg and M. A. Tzannes, "Overlapped Discrete Multitone Modulation for High Speed Copper Wire Communications," IEEE J. Select. Areas Commun., vol. 13, pp. 1571–1585, December 1995.G., supra.

In a DMT modulation scheme, modulation by the inverse discrete Fourier transform (IDFT) of blocks of M input symbols is performed at the rate 1/T'=M/(M+L)T<1/T. After modulation, each block of M signals is cyclically extended by copying the last L signals in front of the block. The parameter 1/T thus denotes the modulation rate of a system where the cyclic extension of signal blocks is not performed. The cyclic extension yields a signal vector with L+M elements, which are converted from parallel to serial. The obtained signals are transmitted over the channel at the rate M/T. The length of the channel impulse response is assumed to be less than or equal to L+1. At the receiver, blocks of samples with length L+M are taken. Block boundaries are placed such that the last M samples depend only on the elements of one cyclically extended block of signals. The first L samples are discarded, and the last M samples of the block are demodulated by the discrete Fourier transform (DFT). The sequence of transmitted symbol vectors can then be detected by assuming a bank of M independent subchannels, at the price of a decrease in the transmission rate by a factor (M+L)/M. It is therefore essential that the number of subchannels is much larger than the length of the channel impulse response, so that the reduction in data rate due to the cyclic extension may be considered negligible. The need for the addition of a cyclic extension, also known as cyclic prefix, arises because of the large amount of spectral overlap between adjacent subchannels. In practice, equalization must be employed in the time domain to shorten the length of the channel impulse response. See: P. J. W. Melsa, R. C. Younce, and C. E. Rohrs, "Impulse Response Shortening for Discrete Multitone Transceivers," IEEE Trans. Commun., vol. 44, pp. 1662–1672, December 1996.

Assume upstream transmission in an HFC network is based on OFDM of DWMT type. A DWMT signal is generated by real-valued input symbols and real-valued filter impulse responses, so that the signal spectrum has Hermitian symmetry around the frequency f=0. The passband signal can be obtained by singe-side band (SSB) modulation or, using a phase-splitter filter with an appropriate spectral roll-off across f=0, vestigial side-band (VSB) modulation. SSB and VSB modulation schemes are currently used, e.g., for the broadcast of analog video signals, and may also be considered for data communications. SSB and VSB, however, are characterized by inferior performance as compared to systems where all signal spectral components are transmitted, e.g., QAM Systems, owing to the difficulties that these schemes present for carrier-phase recovery. To obviate this problem, pilot tones are usually employed to provide carrier-phase information. A descriptin of this is found in K. J. Kerpez, "A Comparison of QAM and VSB for Hybrid Fiber/Coax Digital Transmission," IEEE Trans. Broadcast., vol. 41, pp. 9–16, March 1995, which reference is incorporated by reference in its entirety. Transmission of pilot tones, however, would not be practical in the multiple-access environment considered herein.

Assume now upstream transmission in an HFC network is based on OFDM of DMT type. In this case it is not necessary that a real baseband DMT signal is obtained after serial-to-parallel conversion. By removing the constraint that the complex input-symbol vectors satisfy the Hermitian symmetry conditions one gets a complex baseband DMT signal. Then the passband signal can in principle be obtained by double-side band amplitude and phase modulation (DSB-AM/PM) with zero excess bandwidth. Carrier-phase recovery does not represent a problem in this case. Recall, however, that DMT systems require that the channel impulse response be shortened, so that the length of the cyclic extension is small compared to the modulation interval. In a multiple access environment, the impulse responses of all the individual channels must be shortened. More important, even if a cyclic extension of sufficient length is used, orthogonality holds only if the individual subchannel signals are received in proper synchronism Be of the large amount of spectral overlap between contiguous subchannels, reception of a signal with improper timing phase results in ICI, i.e., the signal will disturb several other subchannel signals and vice versa. This situation cannot be avoided when a cable modem sends a request for registration in a subchannel specified by the HC, without any prior knowledge of the correct timing phase and transmit power level.

Figure 6A:
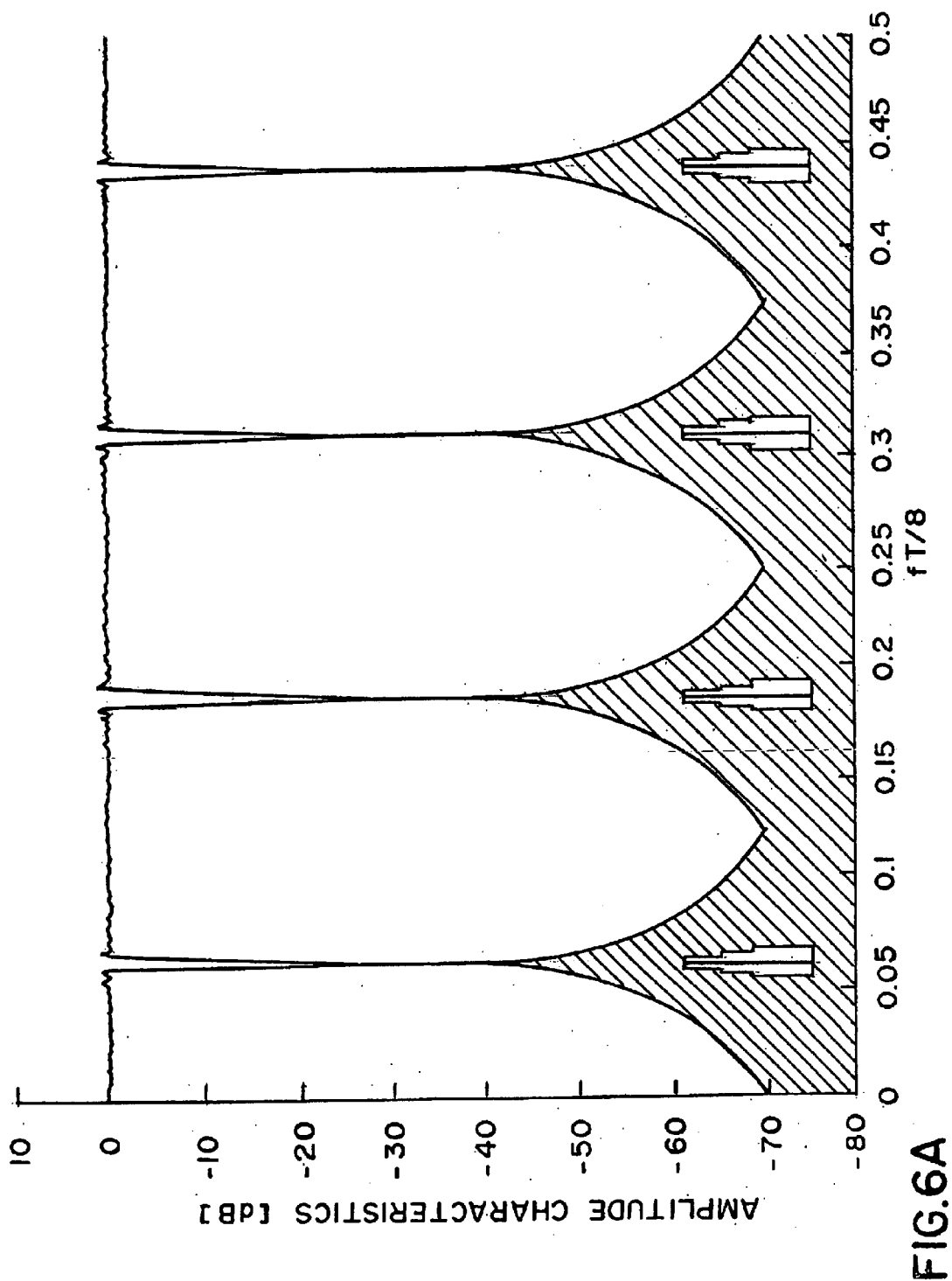
FIGS. 6(a) 6(b) illustrate the frequency responses of subchannel filters in FMT Systems with M=8 and prototype filter designed for 6(a)∂=1 and γ=64, and 6(b) ∂=0.1 and γ=6.
Figure 6B:
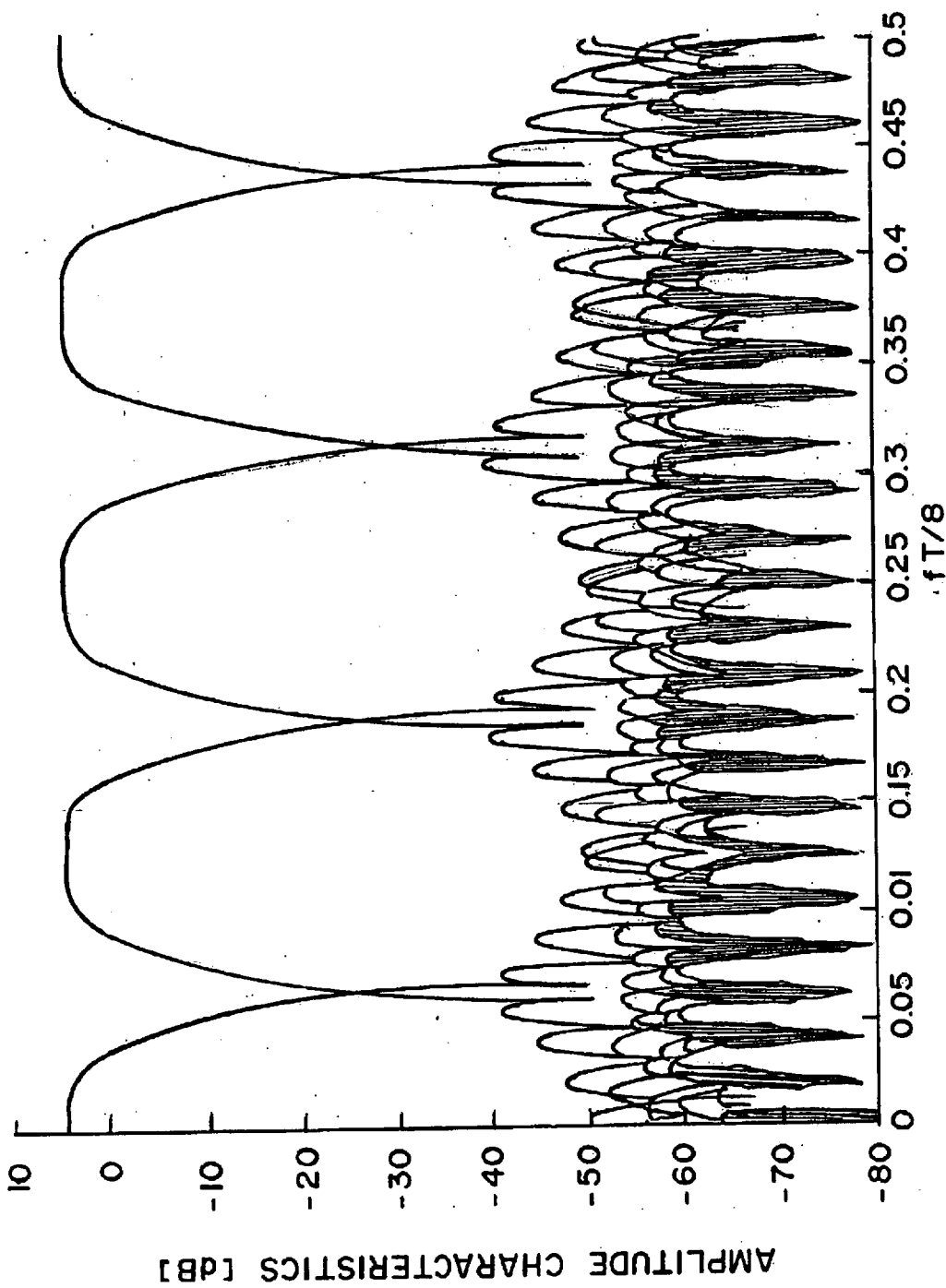

To solve the dilemma posed by passband OFDM transmission in a multiple-access environment, a FMT modulation scheme is herein proposed where a high level of subchannel spectral containment is achieved. With the term FMT modulation we refer to the equivalent baseband scheme of FIG. 5, where the amplitude characteristic of the prototype filter approximates an ideal filter with minimum bandwidth In the present context, we consider for example an ideal filter having a frequency response for f in the interval $$\left[-\frac{M}{2T}, \frac{M}{2T}\right]$$

given by $$H_{ideal}(f) = \begin{cases} \left|\frac{1+e^{-j2\pi fT}}{1+\varrho e^{-j2\pi fT}}\right| & \text{if } -1/2T \le f \le 1/2T \\ 0 & \text{otherwise,} \end{cases} \quad (3)$$

where the parameter $0 \le \partial \le 1$ controls the spectral roll-off of the prototype filter. Note that the frequency response (3) exhibits spectral nulls at the bandedges and is periodic with period M/T. FIGS. 6(a) and 6(b) illustrate the level of subchannel spectral containment achieved by FMT modulation with parameter values M=8, $\partial$=1, γ=64, and M=8, $\partial$=0.1, γ=6, respectively. Background information is also described in a set of lecture notes (cf. section 6.13 for example) authored by the inventor G Cherubini which comprise lecture notes for students on "Algorithms and Circuits for Communications Systems", University of Padova, N. Benvenuto, G. Cherubini, October 1998.

Figure 10:
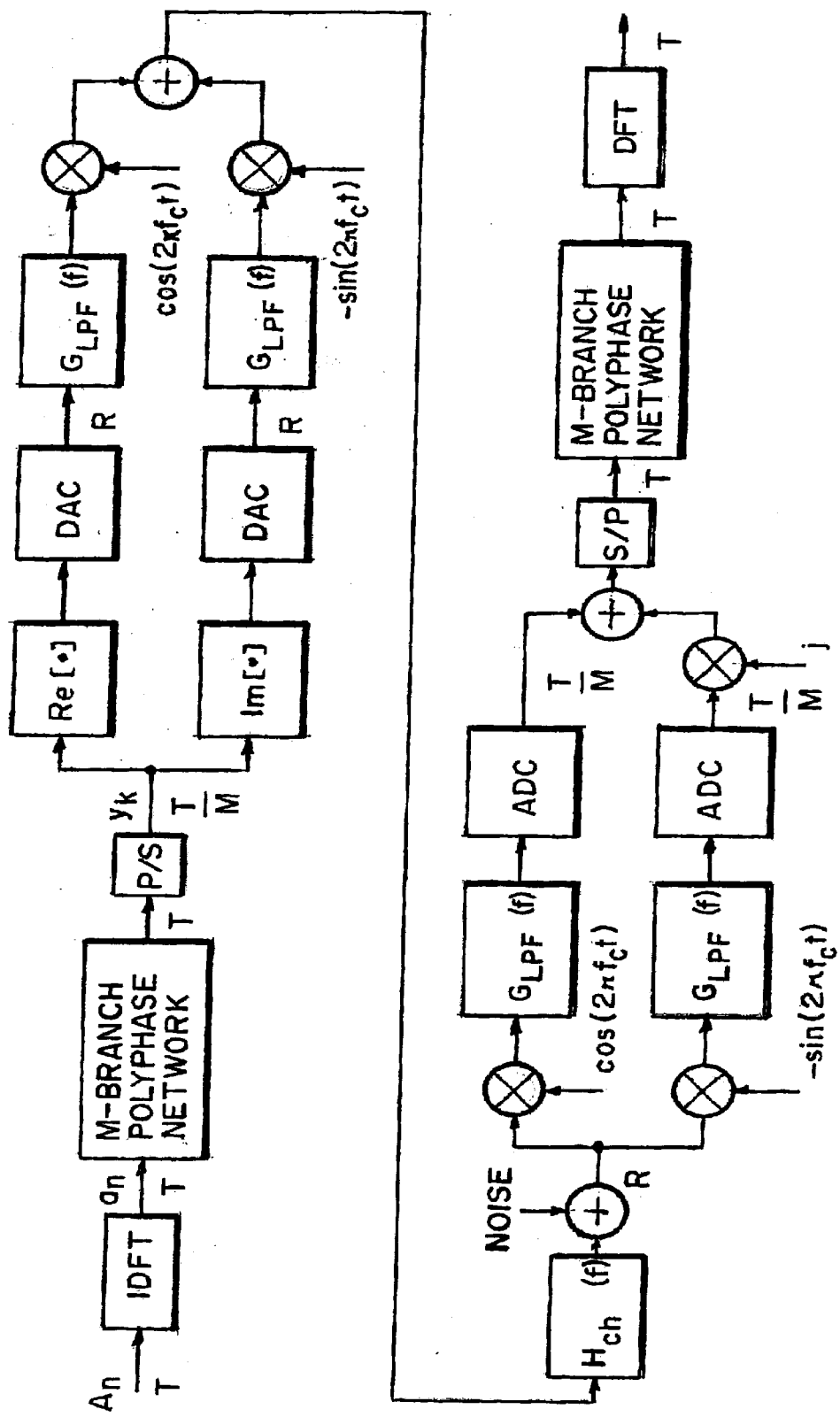
FIG. 10 Shows the block diagram of passband FMT system according to the present invention.

The passband transmission scheme is shown in FIG. 10. The discrete-time real and imaginary parts of the complex baseband signal $y_k$ are converted by D/A converters to analog signals, which are input to a DSB-AM/PM modulator with the carrier frequency $f_c$. The rating signal is transmitted over the upstream channel. The signal at the receiver input is translated to baseband by a DSB-AM/PM demodulator. The obtained in-phase and quadrature signal components are sampled at the rate M/T to yield the real and imaginary parts of the received FMT signal. In the following, we assume perfect knowledge of the frequency $f_c$ and we refer to the equivalent baseband system.

The discrete-time real and imaginary parts of the FMT signal γ are converted by D/A converters to analog signals, which are input to a DSB-AM/PM modulator with the carrier frequency $f_c$. The resulting signal is transmitted over the channel. The signal at the receiver input is translated to baseband by a DSB-AM/PM demodulator where perfect knowledge of the carrier frequency $f_c$ is assumed. The obtained in-phase and quadrature signal components are sampled at the rate M/T to yield the real and imaginary parts of the received signal, which is input to the FMT demodulator. For an ideal system with brickwall filters, the vector obtained at the output of the FMT demodulator could be directly employed to determine an estimate of the transmitted sequence of information symbols. In practice, it is necessary to further process the signal to eliminate residual ISI. Residual ICI can be considered negligible even for moderate lengths of the prototype filter.

The frequency responses of FMT subchannels are characterized by steep roll-off towards the band-edge frequencies, where they exhibit near spectral nulls. This suggests that per-subchannel decision-feedback equalization be performed to recover the transmitted symbols. In transmission systems with trellis coding, the function of decision-feedback filtering is preferably performed at the transmitter by employing precoding techniques. See: M. V. Eyuboglu and G. D. Forney, Jr., "Trellis Precoding: Combined coding, Precoding and Shaping for Intersymbol Interference Channels," IEEE Trans. Inform. Theory, vol. 38, pp. 301–314, March 1992, and R. Laroia, "Coding for Intersymbol Interference Channels—Combined Coding and Precoding," IEEE Trans. Inform. Theory, vol. 42, pp. 1053–1061, July 1996.

Figure 7:
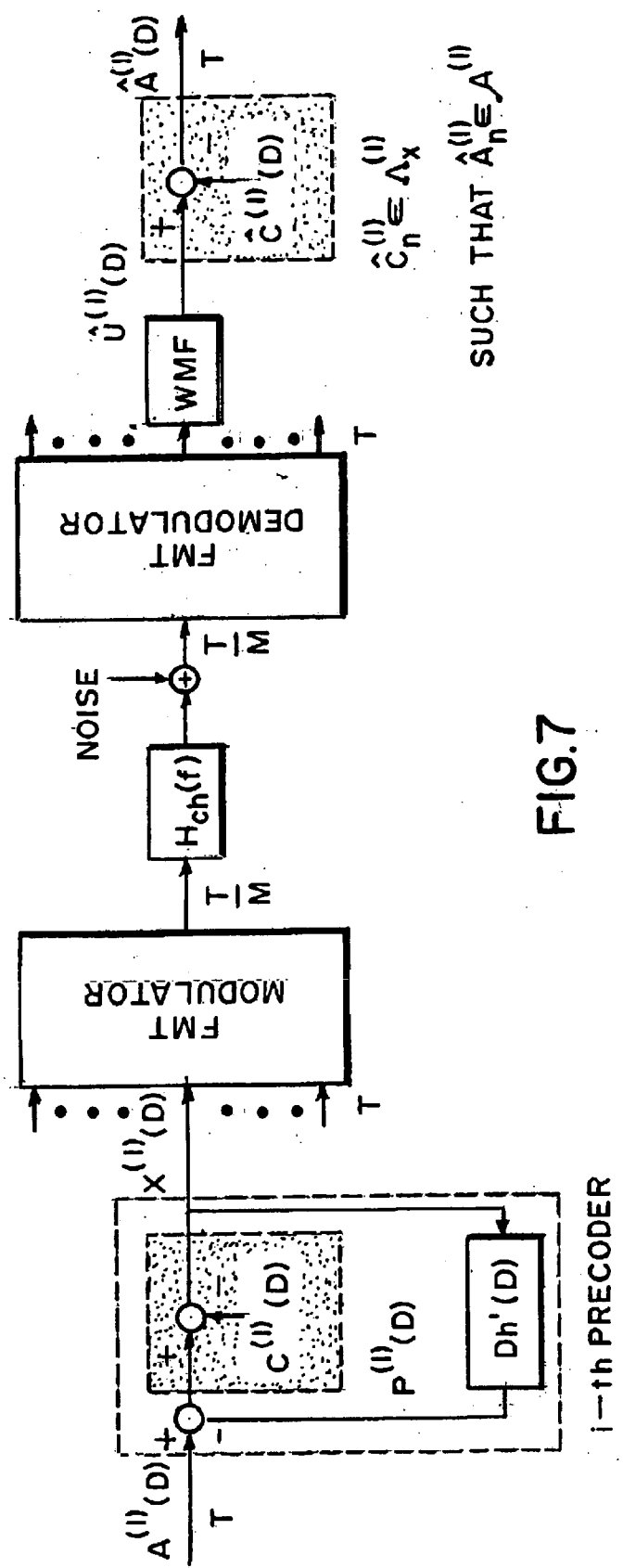
FIG. 7 Shows the block diagram of a FMT system that employs TH preceding according to the present invention.

In this case, optimal detection is achieved by implementing at the receiver only the equalizer forward section, which approximates the whitened matched filter (WMF), and by implementing at the transmitter the feedback section as a precoder. In particular, trellis augmented precoding is the most suitable approach for joint trellis coding and precoding for transmission over channels with spectral nulls. See: U.S. patent application Ser. No. 947,356, filed Oct. 8, 1997, to G. Cherubini, S. Ölçer, and G. Ungerboeck, entitled "Transmission Method and Apparatus Employing Trellis Augmented Precoding," which is incorporated by reference in its entirety. An essential element of trellis augmented precoding is Tomlinson-Harashima (TH) precoding described by M. Tomlinson, in "New Automatic Equalizer Employing Modulo Arithmetic," Electron. Lett., vol. 7, pp. 138–139, March 1971 and by H. Harashima and H. Miyakawa, in "Matched Transmission Technique for Channels with Intersymbol Interference," IEEE Trans. Commun, vol. COM-20, pp. 774–780, August 1972. These references are incorporated by reference in their entireties. In the present context, there is considered uncoded FMT transmission employing per-subchannel TH precoding. Extension to the case of a system with coded modulation employing trellis augmented precoding is straightforward. The block diagram of a FMT system that employs TH precoding is illustrated in FIG. 7.

Figure 8:
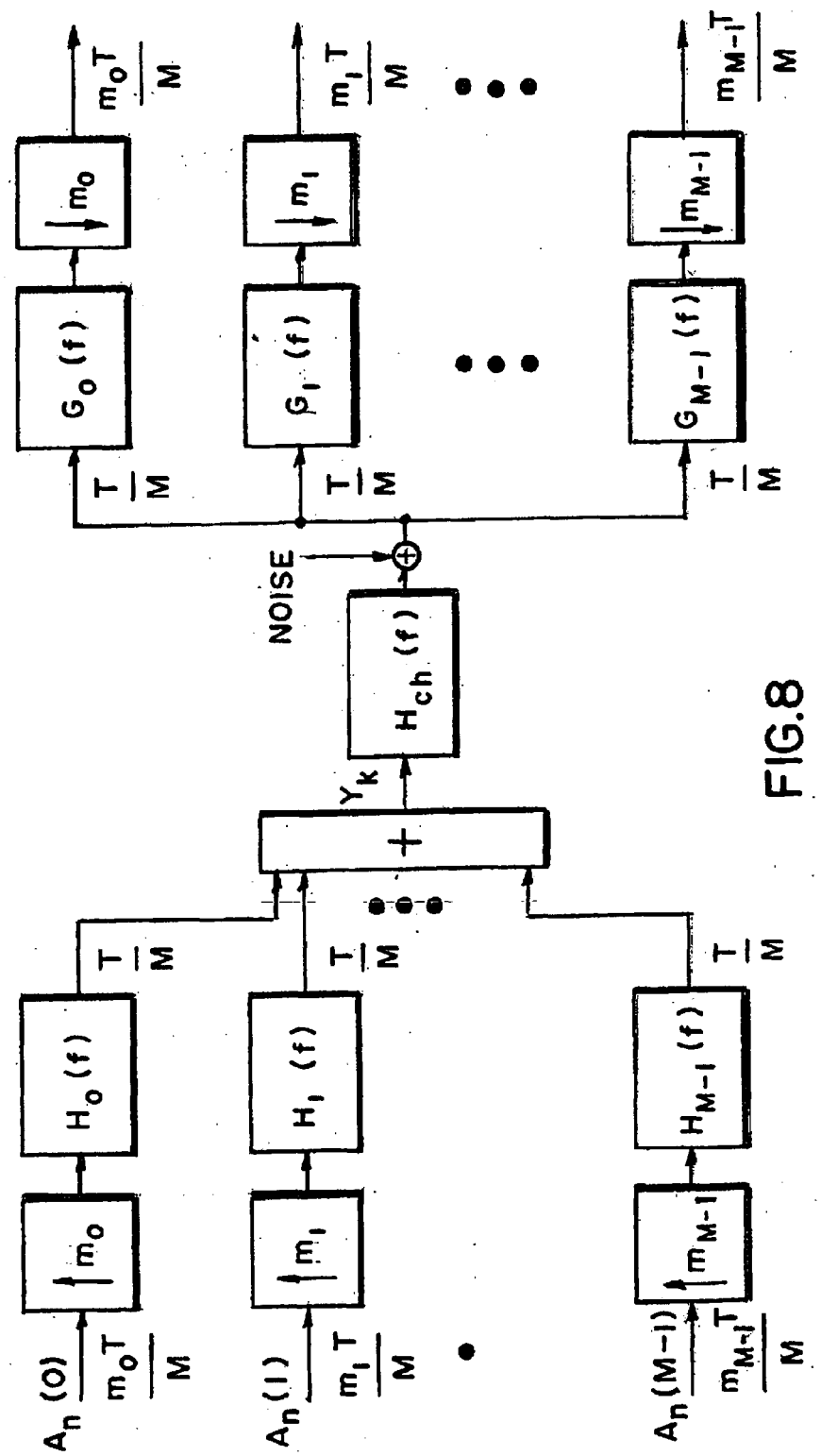
FIG. 8 Shows the block diagram of a generalized transmission system related to OFDM according to the present invention.

In practice, a non-ideal channel must be considered. It is noted that, if the phase characteristic of the channel frequency response is linear and the number of subchannels is sufficiently large, channel distortion may be considered negligible and a simple one-tap equalizer for gain adjustment on each subchannel prior to inverse precoding is sufficient. The challenge to FMT systems comes from channels that are characterized by large phase distortion, because per-subchannel signal equalization/interpolation must then be performed. In this case an all-pass time-domain filter may be employed to compensate for a nonlinear channel phase characteristic, and thus the complexity of per-subchannel equalization/interpolation. Remark: The OFDM system represented in FIG. 3 yields M subchannels, all having the same bandwidth equal to 1/T Hz. In a FMT system, the subchannels further exhibit almost zero spectral overlap and spectral nulls at the bandedges. The OFDM system of FIG. 3 can be generalized as shown in FIG. 8, where the integers $m_i$, i=0, . . . , M−1, are such that $$\sum_{i=0}^{M-1} \frac{1}{m_i} = 1.$$

The transmit and receive filters for the i-th subchannel, denoted by $H_i(f)$ and $G_i(f)$, respectively, have each total bandwidth ≈M/($m_i$T)Hz, and satisfy the condition $G_i(f)=H_i^*(f)$, i=0, . . . , M−1. If we choose the transmit filters such that their frequency responses exhibit almost zero spectral overlap and spectral nulls at the bandedges, one obtains a generalization of a FMT system. To reduce the complexity of the direct implementation of FIG. 8, one may resort for example to a tree-structured filter bank [13].

3. A hybrid TDMA/S-CDMA system based on FMT modulation: S-CDMA is well suited for upstream transmission in HFC networks, since it represents a robust transmission technique in the presence of narrowband. See: M Varanasi and B. Aazhang, "Near-Optimum Detector in Synchronous Code Division Multiple Access Communications," IEEE Trans. Commun., vol. 39, pp. 725–736, May 1991 and also Z. Sivesky, Y. Bar-Ness, and D. Chen, "Error Performance of Synchronous Multiuser Code Division Multiple Access Detector with Multidimensional Adaptive Canceller," European Trans. Commun. & Rel. Technologies, vol. 5, pp. 719–724, November–December 1994.

These references are incorporated by reference in their entireties. Furthermore, adjustment of the transmitted signal power during the initial registration process avoids the near-far problem. On the other hand, some or all of the stations might only occasionally access the channel and transmit in burst mode. To accomodate this type of traffic, which requires fast synchronization capabilities at the HC receiver, TDMA is preferable. The above observations motivate the proposal of a hybrid TDMA/S-CDMA scheme based on FMT modulation for upstream transmission in HFC networks. According to the time-varying characteristics of the disturbances that are present in the channel, and to the requests for resource allocation of each individual station, the HC dynamically assigns to each station a subchannel or a set of subchannels for upstream transmission. The HC also specifies whether during a mini-slot a subchannel is entirely dedicated to upstream transmission of a single station (TDMA), or may be shared by several stations using different signature codes (S-CDMA).

A hybrid TDMA/S-CDMA scheme, according to the present invention, based on FMT modulation allows the HC to allocate resources efficiently to each individual station for a wide range of data rates. Upstream transmission over a singe subchannel was described in the previous section. If application in a TDMA environment is considered, however, two remarks are appropriate:

during initial registration of a station, the HC may compute the round-trip delay compensation value such that there is no need for signal interpolation at the output of a set of subchannels; the HC may then allocate those subchannels for upstream transmission of the registered station, thus avoiding the need for further processing;

if transmission of a message over a subchannel has a finite duration, a "tail" with length equal to L modulation intervals will be observed after the last symbol of the message has been detected; to avoid the need for large guard bands between consecutive messages, cancellation of the tail may be performed.

At this point of the description of the invention S-CDMA in conjunction with FMT modulation is described. In a S-CDMA environment, the signals sharing the same transmission channel can be modeled as cyclostationary interference, which is synchronous with the disturbed signal. Synchronism is due to common timing information provided by the HC to the stations in the network. It has been shown in B. R. Petersen and D. D. Falconer, "Minimum Mean Square Equalization in Cyclostationary and Stationary Interference—Analysis and Subscriber Line Calculations," IEEE J. Select. Areas Commun., vol. 9, pp. 931–940, August 1991, that J–1 synchronous interferers can be suppressed by expanding by a factor J the bandwidth of the transmitted signals, and by employing at the receiver adaptive equalization with T/J-spaced taps. Interference suppression achieved in this manner can be interpreted as a frequency diversity technique. The Peterson et al. reference is incorporated by reference in its entirety.

Figure 9:
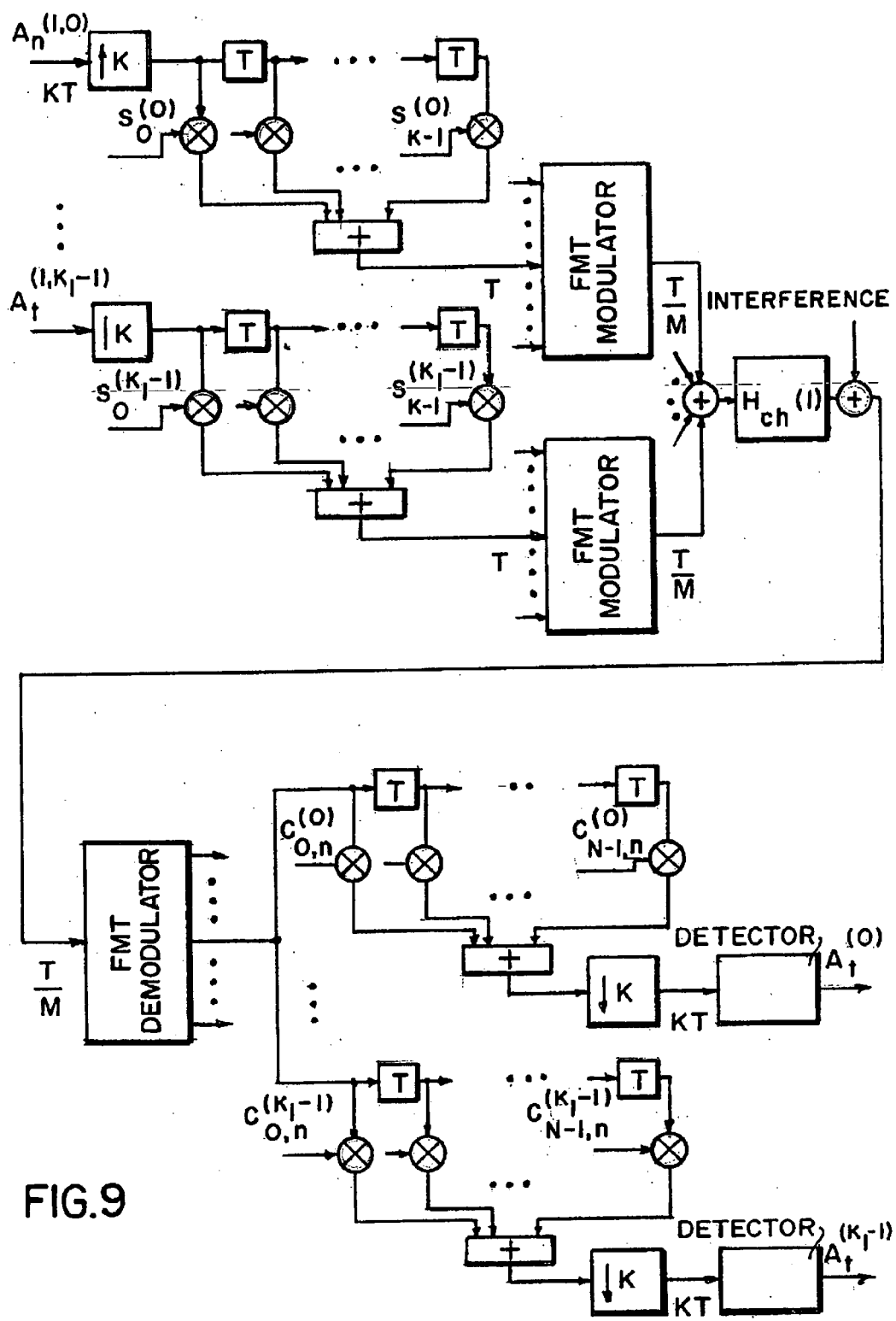
FIG. 9 Shows the realization of a FMT S-CDMA system where $K_i$ stations transmit over the i-th subchannel according to the present invention.

In general, depending on the desired transmission rates and on the interference characteristics, various configurations for FMT S-CDMA transmission over each subchannel may be chosen by the HC. The equivalent baseband realization of a system where $K_i$ stations transmit over the i-th subchannel is illustrated in FIG. 9. Each input symbol sequence is transmitted with the modulation rate 1/KT, with $K_i \leq K$. At the HC receiver, after demodulation by the DFT, assuming only narrowband interferers represent non-negligible noise signals, the i-th subchannel output is given by $$V_n^{(f)} = \sum_{k=0}^{K_i} \sum_{m=-\infty}^{\infty} \left[\sum_{l=0}^{K-1} s_l^{(k)} \tilde{A}_{n-l}^{(i,k)}\right] h_{n-m}^{(i,k)} + \sum_{j=0}^{J-1} U_n^{(i,j)}, \quad (4)$$

where $\{\tilde{A}_n^{(i,k)}\}$ denotes the interpolated sequence of k-th user symbols input to the i-th subchannel, $\{s_n^{(k)}\}$ is the k-th user signature code sequence with length K, $h_n^{(i,k)}$ denotes the overall i-th subchannel impulse response for the k-th station, and $U_n^{(i,j)}$, j=0, . . . , J–1, are narrowband interferers with spectral components in the frequency bands, $B^{(i,j)}$, j=0, . . . J–1 respectively. We assume that the bandwidth of each interfering signal measured in the frequency interval [–1/2T, –1/2T] is less than 1/KT, i.e., $$\int_{B^{(i,j)} \cap [-\frac{1}{2T},\frac{1}{2T}]} df \leq \frac{1}{KT}, \quad j = 0, \ldots, J-1 \quad (5)$$

The signal $V_n^{(f)}$ is filtered by a bank of $K_i$ fractionally-spaced adaptive equalizers with T-spaced taps and KT-spaced equalizer output signals. Let $\tilde{H}^{(i,k)}(f) = S^{(k)}(f)H^{(i,k)}(f)$ denote the overall frequency response from the k-th user symbol source of the i-th subchannel to the i-th DFT output, and $C^{(i,k)}(f)$ denote the frequency response of the k-th adaptive equalizer of the i-th receiver filter bark. We define the matrix of channel responses $$\tilde{H}^{(i)}(f) = \left[\tilde{H}^{(i,k)}\left(f - \frac{l}{KT}\right)\right], \ k = 0, \ldots K_i - 1, l = 0, \ldots, K-1$$

and the vectors of equalizer responses $$C^{(i,k)}(f) = \left(C^{(i,k)}(f), \ldots, C^{(i,k)}\left(f - \frac{K-1}{KT}\right)\right)', \ k = 0, \ldots K_i - 1.$$

Interference free reception of the $K_i$ symbol sequences $\{A_n^{(i,0)}\}, \ldots, \{A_n^{(i,K_i-1)}\}$, is obtained it for every frequency in the interval –1/2 KT <f<1/2 KT and for every index k=0, . . . , $K_i$–1, there exists a solution of the equation $$\tilde{H}^{(i)}(f)C^{(i,k)}(f) = e_k, \quad (6)$$

where $e_k$ denotes the vector with the k-th element equal to 1 and all other elements equal to 0, subject to the constraint $$C^{(i,k)}(f) = 0, \quad f \in \bigcup_{j=0}^{J-1} B^{(i,j)}, \quad k = 0, \ldots, K_i - 1. \quad (7)$$

Assuming unconstrained equalizer length, in the absence of interferers a solution to (11) will always exist if the coefficient matrix has rank $K_i$. In the presence of narrowband interferers, a solution will always exist if the condition $J \leq K-K_i$ is verified, and the matrix $\tilde{H}^{(i)}(f)$ is such that, for every frequency in the interval –1/2 KT <f<1/2 KT, by setting arbitrarily to zero J columns the rank of the resulting matrix is still equal to $K_i$. For a practical implementation a compromise between equalizer length and achieved interference suppression has to be made.

4. Ranging and power adjustment: In this section, a possible realization of the ranging and power adjustment process using FMT modulation is described. As in the case of rant and power adjustment when single-carrier QAM is employed, a station first tunes its receiver to a downstream channel that conveys MAC information and acquires the global timing reference provided by the HC. Thereafter, when an Allocation Map (MAP) message with an Initial Maintenance IE is received, the cable modem sends a RNG-REQ message in the specified subchannel, which results in negligible ICI in adjacent subchannels. If a Ranging Response (RNG-RSP) message is not received, subsequent RNG-REQ messages are sent with increasing transmit power, e.g., incremented by 1 dB steps.

For RNG-REQ messages, one may consider a transmission format with a preamble containing a constant-amplitude zero autocorrelation (CAZAC) sequence of length K, e.g., K=16, which is repeated P times, e.g., P=8, followed by a special start-of-message (SOM) sequence. The CAZAC and SOM sequences may be specified in the MAP message.

Detection of periodic CAZAC sequences in the HC may be performed as described in [25]. Upon detection of the CAZAC sequence, the HC performs channel identification by a least-squares algorithm [26]. From the amplitude and phase characteristics of the identified channel response a transmit power level adjustment and a timing phase $\tau \in [0, T]$ are derived. The timing phase is needed to compute the round-trip delay compensation to receive the FMT signal in proper synchronism. The detection of the signature sequence provides the HC with further timing information that is used to determine the total round-trip delay from the head-end node to the station, and hence the round-trip delay compensation.

After determining the transmit power level adjustment and the round-trip delay compensation, the HC sends this information to the station as part of a RNG-RSP message. The station then waits for a MAP message with an individual Station Maintenance IE, and sends at the specified time a RNG-REQ message using the power level and timing corrections. The HC receives this RNG-REQ message in proper synchronism at the T-spaced filter bank output. The HC returns another RNG-RSP message to the station with information about any additional fine tuning required. The ranging request/response steps are repeated until the response contains a Ranging Successful notification.

5. Contention resolution: In this section the problem of contention resolution is addressed, which arises when several stations 6 send request messages in a mini-slot specified in a Request IE. Various methods that result in higher efficiency than the simple random backoff protocol mentioned in Section 1 have been proposed in D. Sala and J. O. Limb, "Comparison of Contention Resolution Algorithms for a Cable Modem MAC Protocol," 1998 Int. Zurich Seminar on Broadband Communications, February 1998, pp. 83–90.

This reference is hereby incorporated by reference in its entirety. For example, in IEEE Project 802.14/a Draft 3 Revision 1, "Cable-TV access method and physical layer specification" IEEE, Apr. 13, 1998, contentions are resolved using a ternary tree algorithm as in J. L. Massey, "Some New Approaches to Random-Access Communications," Multiple Access Communications, edited by N. Abramson, IEEE Press Piscataway, N.J., 1993. Here, for contention, a new probing algorithm that exploits the characteristics of upstream FMT transmission is proposed.

A request message from a station consists of a pseudo-random signature sequence of N bits, which identifies the station and is transmitted using differentially encoded BPSK is proposed herein. Alsoan ideal upstream transmission for all stations sending request messages in the specified contention subchannel, i.e, transmitted symbols are received at the subchannel output in the absence of noise and interference is assumed. Because of possible multiple frequency translations of the upstream signals taking place at intermediate points of the network, the received symbols of a request message are rotated by a random phase, which is assumed to be constant over N modulation intervals. The phases associated to different messages are assumed to be independent.

If J stations transmit simultaneously request messages in a contention mini-slot specified over the i-th subchannel in the time interval (0, NT), the received sequence is given by $$V_n = \sum_{k=0}^{J-1} A_n^{(i,k)} e^{j\theta_k}, \quad n=0,\ldots,N-1, \quad (8)$$

where $A_n^{(i,k)} \epsilon(-1,+1)$ and $\theta_k \epsilon(0, 2\pi)$. On a two-dimensional plane, the set of points $\{V_n, n=0, \ldots, N-1\}$ is associated with the set of positive values $\{\zeta_j, j=0, \ldots, N(N-1)/2-1\}$, possibly not all distinct, which represent the distances between points. The algorithm can be described by the following two steps.

Step I: If $\zeta_j \neq 2$, $\forall j$, the HC selects two points $V_{i_0}$ and $V_{i_1}$, such that $|V_{i_0}|=\max |V_i|$ and $|V_{i_1}|=\min|V_i|$, and splits the group of stations in two groups by asking that the stations transmit a new request message in one of two mini-slots. The transmission rule is such that stations hat a signature sequence whose symbols differ in the i-th and m-th positions send a new request message in the first mini-slot, and the remaining sta-tions send a new request message in the second. The HC needs now to resolve contentions between two smaller groups of stations.

Step II: If one of the distances is such that $\zeta_{j_0}=|V_i-V_m|=2$, it is likely that all the stations but one have signature sequences whose symbols in the i-th and m-th position are equal. The HC then specifies a new mini-slot where only those stations that have a signature sequence whose symbols in the i-th and m-th position are different are allowed to send a new request message. Two cases must be considered.

Only one station with index $k_0$ transmits a new message. The HC will cor-rectly detect it and will also be able to determine the message $\{A_n^{i,k_0} e^{j\theta_{k_0}}\}$ in (8). From the recovered information, the HC then computes a new sequence $$V^i_n = V_n - A_n^{(i,k0)} e^{j\theta_{k0}}, \quad n=0, \ldots, N-1, \quad (9)$$

and a new set of associated distances $\{\zeta^i_j, j=0, \ldots, N(N-1)/2-1\}$. If no distance equal to 2 is found, the HC applies Step I to the sequence (9), otherwise it applies Step II.

Several stations transmit a new message. Then the HC needs to resolve contentions between two smaller groups of stations. The resolution of the contention among the stations that have not retransmitted a new message is initiated by applying Step I.

Steps I and II are repeated until all stations are identified. Note that the last two stations involved in a contention are identified with only one retransmission, since in this case yields the signature sequence of the last station.

A typical multiple access communications network system according to the present invention has a head-end node, downstream and shared upstream channels, and at least one station node, where the head-end node comprises a head-end controller (HC) capable of transmitting data and medium-access control (MAC) information to said station node over at least one downstream channel within a first frequency range. The head-end controller (HC) is furthermore capable of receiving information from said station node over L subchannels, with L=1, 2, . . . , M, on the shared upstream channel with bandwidth $1/T_c$. L subcarriers are employed for upstream transmission over said L subchannels of blocks of L symbols, each taken from a symbol constellation, and the transmission over the i-th subchannel, with i=0, . . . , M−1, takes place at a modulation rate of $1/(m_i T_c)$ symbols/s. The i-th subchannel has a bandwidth of $1/(m_i T_c)$ Hz, where the numbers $m_i$ satisfy the condition $$\sum_{i=0}^{M-1} \frac{1}{m_i} = 1.$$

At least one subchannel has spectral nulls at the bandedges, and at least one subchannel has zero guard bands.

Various modifications of the above disclosed embodiments will be apparent to those skilled in the art. For example, cable means can be replaced, in part or in toto, by wireless links of the type known in data transmission technology.

I claim:

1. A digital transmission scheme for use in a multiple access communications network system with a system comprising an upstream channel with a bandwidth of $1/T_c$ Hz for transmission of information from remote stations to a head-end node, where a baseband signal is transmitted as passband signal employing a modulator, said baseband signal being generated by employing M subcarriers for transmission over M subchannels of blocks of M symbols, each taken from a symbol constellation, where the transmission over the i-th subchannel, with i=0, ..., M−1, takes place at a modulation rate of $1/(m_i T_c)$ symbols/s, the i-th subchannel has a bandwidth of $1/(m_i T_c)$ Hz, where the numbers $m_i$ satisfy the condition $$\sum_{i=0}^{M-1} \frac{1}{m_i} = 1$$

at least one subchannel has spectral nulls at the bandedges, and at least one subchannel has zero guard bands.

2. The scheme according to claim 1, where each subchannel has a high level of spectral containment.

3. The scheme according to claim 1 having negligible interchannel interference.

4. The scheme according to claim 1, where said M subcarriers are orthogonal.

5. The scheme according to claim 1, where said symbol constellation is a QAM (quadrature-amplitude modulation) constellation.

6. The scheme according to claim 6, where there are M QAM (quadrature-amplitude modulation) constellations which are not identical.

7. The scheme according to claim 1, where $m_i$=M for all i such that each of said subchannels has a bandwidth equal to $1/(MT_c)$=1/T Hz, and such that said channel bandwidth is equal to M/T Hz.

8. The scheme according to claim 7, where prior to said transmission the signals are filtered by filtering means at a transmitter to obtain a subchannel's spectral characteristic.

9. The scheme according to claim 7, where filtering means are employed at a receiver for filtering of transmitted signals after reception.

10. The scheme according to claim 8, where said filtering means at a transmitter have a frequency response which is obtained by shifting in frequency by i/T Hz, with i=0, ..., M−1, the frequency response of a transmitter prototype filter which approximates an ideal filter with zero frequency response outside of the interval [−1/2 T, 1/2 T].

11. The scheme according to claim 9, where said filtering means at a receiver have a frequency response which is obtained by shifting in frequency by i/T Hz, with i=0, ..., M−1, the frequency response of a receiver prototype filter which approximates an ideal filter with zero frequency response outside of the interval [−1/2 T, 1/2 T].

12. The scheme according to claim 11, where said prototype filter is a filter with an amplitude characteristic which approximates a frequency response that exhibits spectral nulls at ±1/2T.

13. The scheme according to claim 10, where said prototype filter is a filter with an amplitude characteristic which approximates a frequency response given by $$H_{ideal}(f) = \begin{cases} \left|\frac{1+e^{-j2\pi fT}}{1+\rho e^{-j2\pi fT}}\right| & \text{if } -1/2T \le f \le 1/2T \\ 0 & \text{otherwise} \end{cases}$$

where the parameter $0 \le \rho \le 1$ controls the spectral roll off of said prototype filter.

14. The scheme according to claim 2, where each subchannel has the same bandwidth of 1/T Hz.

15. The scheme according to claim 8, where said filtering means at a transmitter are realized by the cascade of an inverse discrete Fourier transform (IDFT) unit, followed by an M-branch filter bank network where a filter on the i-th branch is given by the i-th polyphase component of the transmitter's prototype filter, and a parallel-to-serial converter yielding a signal transmitted over said channel at the rate of M/T samples/s.

16. The scheme according to claim 9, where said filtering means at a receiver are realized by the cascade of a serial-to-parallel converter yielding M signals in parallel at the rate of 1/T samples/s, an M-branch filter bank network where a filter on the i-th branch is given by the i-th polyphase component of said receiver prototype filter, followed by a discrete Fourier transform (DFT) unit.

17. The scheme according to claim 1, where detection is achieved by per-subchannel equalization employing a linear equalizer, or a Viterbi detector.

18. The scheme according to claim 17, where said per-subchannel equalization is realized by a decision-feedback equalizer.

19. The scheme according to claim 18, where the feedback section of said decision-feedback equalizer is implemented as a precoder in a transmitter.

20. The scheme according to any of the preceding claims, where time-domain filtering is carried out for adjustment of the system's channel phase characteristic.

21. The scheme according to claim 1, where oversampling of subchannel output signals is performed to allow interpolation/equalization of said signals prior to symbol detection.

22. The scheme according to claim 1, where said head-end node comprises a head-end controller (HC) with a ranging and power adjustment unit for periodically specifying a subchannel for ranging and power adjustment of station nodes, preferably unregistered station nodes.

23. The scheme according to claim 22, where said ranging and power adjustment unit employs a ranging and power adjustment procedure which does not disturb upstream transmission over other subchannels.

24. The scheme according to claim 22, where said ranging and power adjustment unit periodically specifies a subchannel for ranging and power adjustment of unregistered station nodes, which unregistered station nodes send messages over said subchannel to perform said ranging and power adjustment.

25. The scheme according to claim 1, where said head-end node comprises a head-end controller (HC) which periodically specifies a subchannel where registered station nodes may send request messages for upstream channel resources, that is the time axis is divided into a sequence of mini-slots, and during a mini-slot said subchannel is dedicated to upstream transmission of those station nodes wishing to access the upstream channel.

26. The scheme according to claim 25, wherein a station node is being identified by the transmission of a signature sequence.

27. The scheme according to claim 25, wherein said head-end controller (HC) issues a command for retransmission of request messages in case of contention between more than one station node, said command being generated after inspecting the output signal of said subchannel with the objective of reducing the number of stations means involved in subsequent contentions.

28. The scheme according to claim 27, wherein said command for retransmission is issued such that the probability that only one station node at the time sends a request message in subsequent mini-slots is maximum, until all station nodes participating in a first contention have been identified.

29. The scheme according to claim 26, wherein said signature sequence is a pseudo-random signature sequence.

30. The scheme according to claim 29, wherein said signature sequence is transmitted over said subchannel using an input BPSK symbol constellation.

31. A multiple access communications network system having a head-end node and at least one station node, said head-end node comprising a head-end controller (HC) capable of transmitting data and medium-access control (MAC) information to said station node over at least one downstream channel within a first frequency range, and capable of receiving information from said station node transmitted as passband signals over L subchannels, with L=1, 2, ..., M, on a shared upstream channel, where said station node generates baseband signals and transmits them as passband signals employing a modulator, where said baseband signal is generated by employing L subcarriers for transmission of blocks of L symbols, each taken from a symbol constellation, such that the transmission over the i-th subchannel, with i=0, ..., M−1, takes place at a modulation rate of $1/(m_i T_c)$ symbols/s, the i-th subchannel has a bandwidth of $1/(m_i T_c)$ Hz, where the numbers $m_i$ satisfy the condition $$\sum_{i=0}^{M-1} \frac{1}{m_i} = 1,$$

at least one subchannel has spectral nulls at the bandedges, and at least one subchannel has zero guard bands.

32. The communications network system according to claim 31, wherein said station node comprises a transmitter for sending information to said head-end controller (HC).

33. The communications network system according to claim 31, wherein said head-end controller (HC) comprises a ranging and power adjustment unit for periodically specifying a subchannel for ranging and power adjustment of station nodes, preferably unregistered station nodes.

34. The communications network system according to claim 33, wherein said ranging and power adjustment unit employs a ranging and power adjustment procedure which does not disturb upstream transmission over other subchannels.

35. The communications network system according to claim 33, wherein said ranging and power adjustment unit periodically specifies a subchannel for ranging and power adjustment of unregistered station nodes, which unregistered station nodes send messages over said subchannel to perform said ranging and power adjustment.

36. The communications network system according to claim 31, wherein said head-end controller (HC) periodically specifies a subchannel where registered station nodes may send request messages for upstream channel resources, that is the time axis is divided into a sequence of mini-slots, and during a mini-slot said subchannel is dedicated to upstream transmission of those station nodes wishing to access the upstream channel.

37. The communications network system according to claim 31, wherein a station node is being identified by the transmission of a signature sequence.

38. The communications network system according to claim 31, wherein said head-end controller (HC) issues a command for retransmission of request messages in case of contention between more than one station node, said command being generated after inspecting the output signal of said subchannel with the objective of reducing the number of stations means involved in subsequent contentions.

39. The communications network system according to claim 38, wherein said command for retransmission is issued such that the probability that only one station node at the time sends a request message in subsequent mini-slots is maximum, until all station nodes participating in a first contention have been identified.

40. The communications network system according to claim 37, wherein said signature sequence is a pseudo-random signature sequence.

41. The communications network system according to claim 40, wherein said signature sequence is transmitted over said subchannel using an input BPSK symbol constellation.

42. The communications network system according to claim 31, wherein said head-end controller (HC) periodically specifies whether upstream transmission over a subchannel is performed using a TDMA protocol, that is the time axis is divided into a sequence of mini-slots, and said subchannel during one mini-slot is dedicated to upstream transmission of a single station node.

43. The communications network system according to claim 42, wherein said head-end controller (HC) periodically specifies whether upstream transmission over a subchannel is performed using a CDMA protocol, that is the time axis is divided into a sequence of mini-slots, and said subchannel during at least one mini-slot is dedicated to upstream transmission of at least one station node, preferably a plurality of station nodes, each station node using a different signature code.

44. The communications network system according to claim 31, wherein said head-end controller (HC) computes the round-trip delay compensation of said station node such that the processing needed for detection of the messages transmitted by said station node over a subchannel or a set of subchannels is reduced.

45. The communications network system according to claim 31, wherein transmission of a message by said station node over a subchannel has a tail of samples at the output of said subchannel, and wherein means are provided at said head-end controller (HC) for cancellation of said tail, such that guard bands between consecutive messages are reduced.

46. The communications network system according to claim 31, wherein at least one downstream channel is a broadcast channel for downstream transmission from said head-end controller (HC) to said station node.

47. The communications network system according to claim 28, wherein a shared upstream channel is divided into subchannels for upstream transmission from said station node to said head-end controller (HC).

48. The communications network system according to claim 28 being a hybrid fiber/cable (HFC) system, or a multichannel multipoint distribution service (MMDS) system, or a local multipoint distribution service (LMDS) system.

* * * * *